United States Patent [19]

Spokas et al.

[11] Patent Number: 4,474,082
[45] Date of Patent: Oct. 2, 1984

[54] CONTROL SYSTEM FOR POWER SHIFTED TRANSMISSION

[75] Inventors: Romas B. Spokas; Fred D. Sturges, both of Rockford; Alan L. Miller, Mount Prospect; Robert A. Fox, Hoffman Estates, all of Ill.

[73] Assignee: Borg-Warner Corporation, Chicago, Ill.

[21] Appl. No.: 301,245

[22] Filed: Sep. 11, 1981

[51] Int. Cl.³ .................... B60K 41/08; F16D 67/00; F16D 11/00
[52] U.S. Cl. ...................................... 74/866; 74/867; 192/3.58; 192/109 F
[58] Field of Search ................ 74/866, 752 A, 752 C, 74/862, 864, 878, 866, 867, 868, 869; 192/3.58, 13 R, 87.18, 87.19, 109 F

[56] References Cited

U.S. PATENT DOCUMENTS

| 3,137,311 | 6/1964 | Rohweder et al. | 192/109 F |
|---|---|---|---|
| 3,709,064 | 1/1973 | Schaefer et al. | 74/867 X |
| 3,710,647 | 1/1973 | Dach et al. | 74/866 X |
| 3,733,932 | 5/1973 | Uozumi et al. | 74/869 |
| 3,805,640 | 4/1974 | Schneider et al. | 74/866 X |
| 3,874,255 | 4/1975 | Minami | 74/866 |
| 3,951,011 | 4/1976 | Lemon | 74/869 |
| 4,006,652 | 2/1977 | Murakami | 74/869 |
| 4,046,033 | 9/1977 | Hashimoto et al. | 74/869 |
| 4,067,423 | 1/1978 | Schneider et al. | 74/878 X |
| 4,227,602 | 10/1980 | Ideta et al. | 192/109 F |
| 4,259,882 | 4/1981 | Miller | 74/866 |

FOREIGN PATENT DOCUMENTS

| 2280838 | 4/1976 | France | 74/867 |
|---|---|---|---|
| 2030245 | 4/1980 | United Kingdom | 74/866 |
| 2051979 | 6/1980 | United Kingdom | 74/866 |
| 2037911 | 7/1980 | United Kingdom | 74/866 |

Primary Examiner—Allan D. Herrmann
Assistant Examiner—Stephen B. Andrews
Attorney, Agent, or Firm—James J. Jennings, Jr.

[57] ABSTRACT

A control system for a power shifted transmission includes an electrical signal processing system, incorporating a digital processor, which provides output signals to regulate operation of the directional clutch and the range clutches through a plurality of spool valves. A hydraulic stabilizer is connected to a common line supplying the directional clutch, to provide a predetermined amount of fluid with each change in direction, with the remainder of the fluid being provided through a forward-reverse modulating valve. A neutral bleed valve is connected to reduce the measured amount of fluid in the stabilizer when the clutch is being shifted from the neutral position, instead of a full directional change. To improve range shifts, the directional clutch is slipped while the range change is made, and the directional clutch is then re-applied. A horsepower indicator provides the vehicle operator with an instantaneous indication of the vehicle operating efficiency. "Inching" or low speed operation, notwithstanding a high engine speed, is also provided.

18 Claims, 14 Drawing Figures

INITIALIZE AND MAIN PROGRAM

CONTROLLER
SUBROUTINE

DIRECTION SHIFT SUBROUTINE

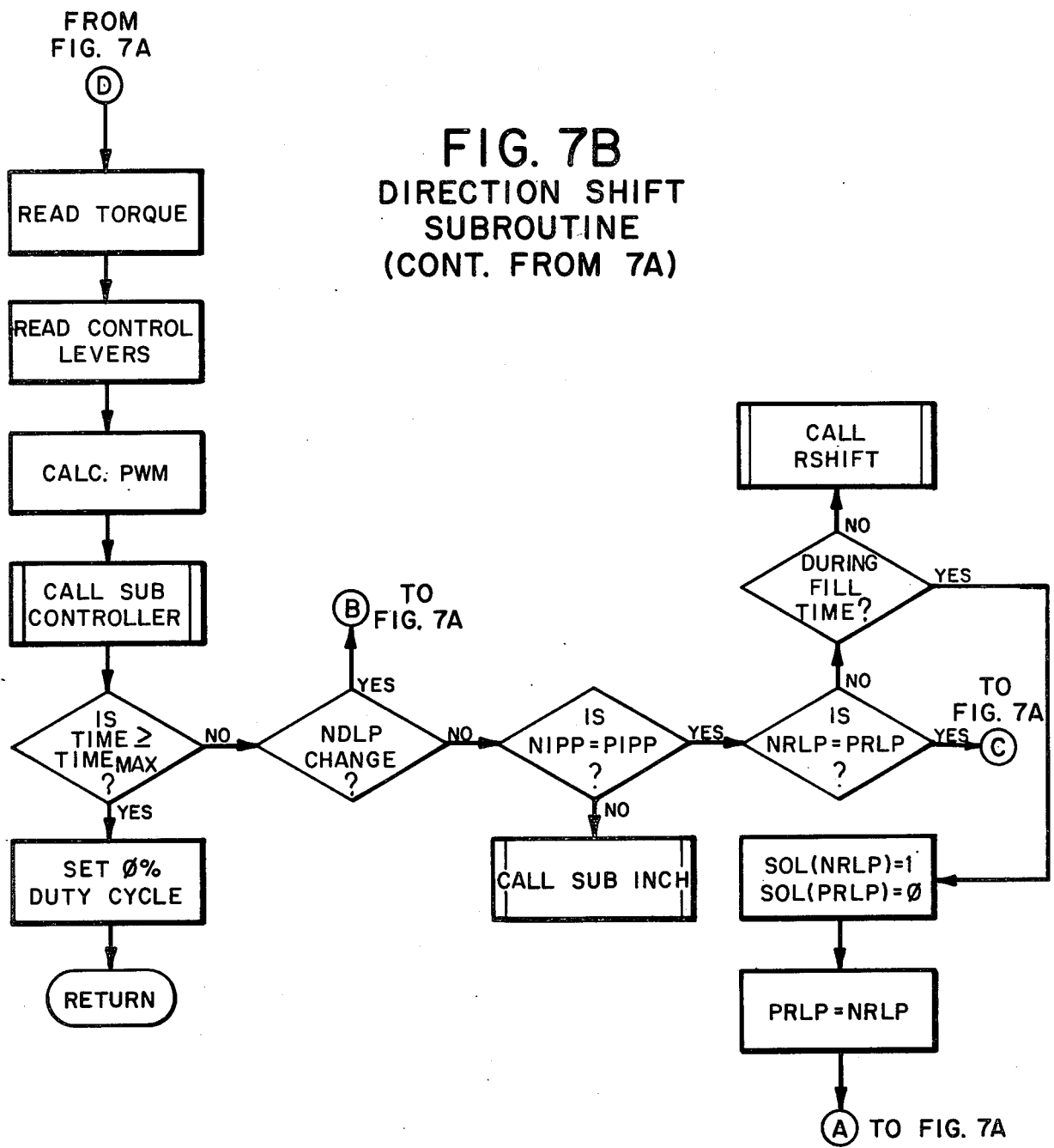

RANGE SHIFT SUBROUTINE

RANGE SHIFT
SUBROUTINE
(CONT. FROM 8A)

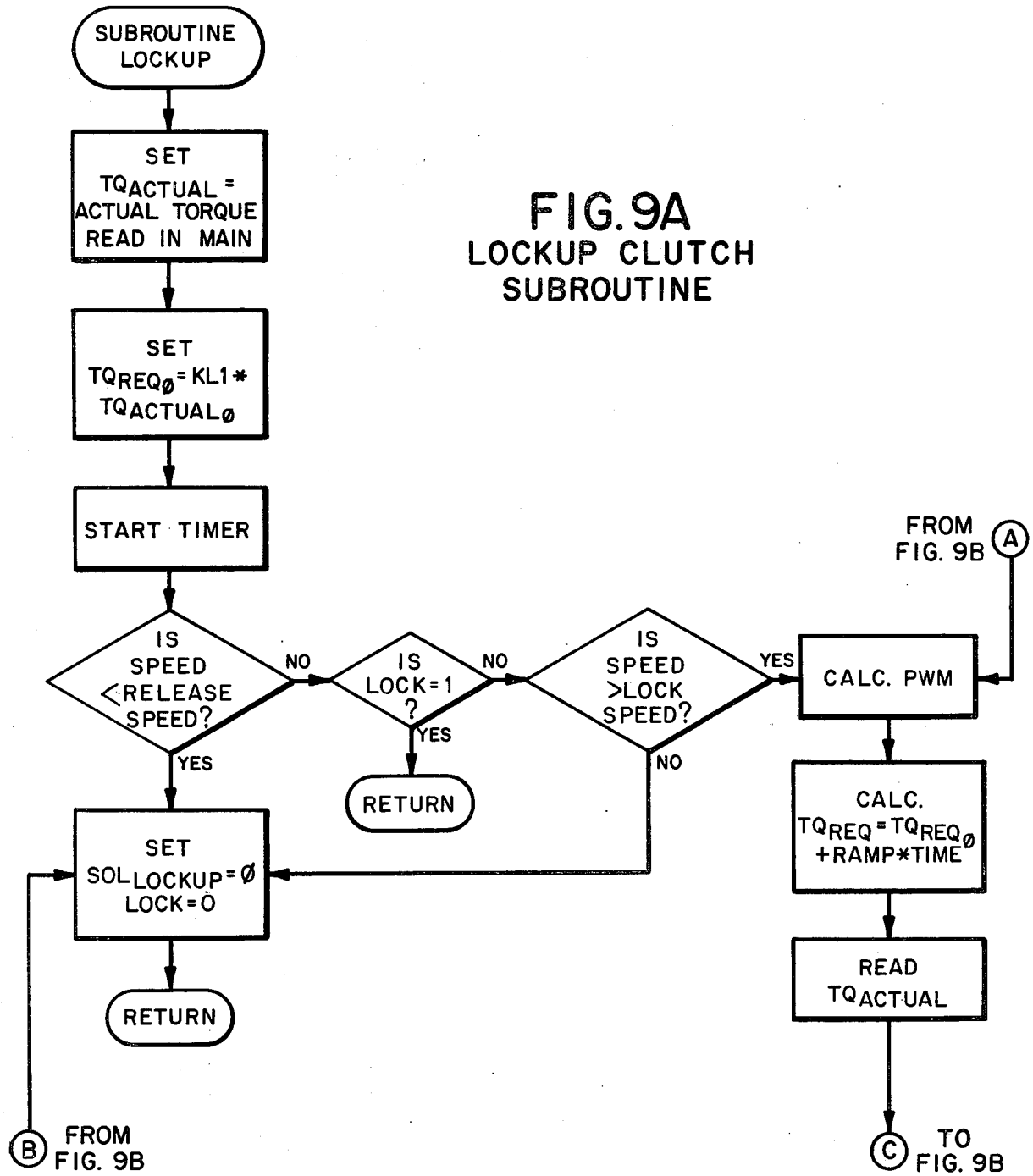

LOCKUP CLUTCH
SUBROUTINE
(CONT. FROM 9A)

INCHING
SUBROUTINE

INCHING SUBROUTINE
(CONT. FROM 10A)

CONTROL SYSTEM FOR POWER SHIFTED TRANSMISSION

BACKGROUND OF THE INVENTION

The present invention is generally related to a control system for effective regulation of a power shifted transmission. The invention is in the area of power shifted transmissions such as that described and claimed in U.S. Pat. No. 4,259,882, entitled "Electronic Shift Control", issued Apr. 7, 1981 and assigned to the assignee of this application.

When internal combustion engines began to be utilized in off-road equipment, sliding gear transmissions and manually operated clutches were utilized to match the engine operating speed to the appropriate vehicle speed. Since vehicles of this type have an extremely large rolling resistance and come to a stop in a fraction of a second after the power is removed, the operator had to select a gear for a particular portion of the cycle and start the vehicle by slipping the clutch. When a higher gear was selected, the clutch had to be slipped excessively to get the vehicle moving, resulting in a severely abbreviated clutch life.

As the effort to increase machinery productivity pushed engine horsepower upward and cycle time downward, net types of power transmissions were developed. Torque converters were introduced to automatically provide a portion of the torque multiplication required. Constant mesh gear transmissions with the power path selected manually by engagement of proper jaw couplings were also introduced. Because of shifting difficulties with the mechanical jaw clutches, they were replaced by multiplate, hydraulically actuated disc clutches. Transmissions of this type are in wide use today.

Even with the significant advance in this art illustrated in the patent identified above, there is still a need to further improve shift quality and still maintain the extremely short shift time, that is, the time interval during which power flow through the vehicle drive line is interrupted by the shifting sequence. It is therefore a principal consideration of this invention to provide an improvement in the shift quality even beyond that attained with the system of the above-referenced patent.

Another important consideration is to obtain such shift improvement in part by increasing the system gain, but without causing instability in the system. Another important consideration is to provide an improved control system in which undue loads are not imposed on the range shift clutches after the significant improvement in the main clutches, or forward/reverse clutch, has been achieved.

SUMMARY OF THE INVENTION

A control system constructed in accordance with the invention is useful in regulating the amount and direction of torque transferred from an engine through a transmission to a vehicle drive train. The transmission includes a plurality of clutches selectively actuable to control the amount and direction of torque transferred, with a plurality of valves to regulate fluid flow from a supply line to the selected ones of the clutches. The control system comprises a hydraulic regulating system for regulating operation of the clutches, and a forward-reverse modulating valve, coupled to the hydraulic regulating system, for use in connection with precise regulation of the forward and reverse clutches. A signal processing system passes control signals to the hydraulic regulating system and to the forward-reverse modulating valve as a function of input signals, including an input signal denoting the torque at a point between the engine and the final drive train of the vehicle.

In accordance with an important aspect of the invention, a hydraulic stabilizer is coupled to a common line between the forward-reverse modulating valve and the hydraulic regulating system, to enhance system operation by controlling the flow to the clutches without imposing a substantial pressure drop on the system.

In accordance with another important aspect of the invention, a neutral bleed valve is coupled to the same hydraulic common line. The neutral bleed valve includes an orifice. In its neutral position, the neutral bleed valve is effective to pass fluid from the common line through its orifice and to a sump, so that an effective orifice in the modulating valve is coupled in series with the orifice in the neutral bleed valve to reduce the pressure, and thus the flow, at the stabilizer when the system is in its neutral position. This provides an effective charge in the stabilizer which is less than the stabilizer capacity but sufficient to bring on the appropriate clutch from the neutral position.

In accordance with another aspect of the invention, the control system regulates the application and release of the range clutches by slipping the main clutch during each range shift, to realize a smooth shift and avoid undue loading of the range clutches.

DESCRIPTION OF THE DRAWINGS

In the several figures of the drawings, like reference numerals identify like components, and in those drawings.

DETAILED DESCRIPTION OF THE INVENTION

Figure 1:
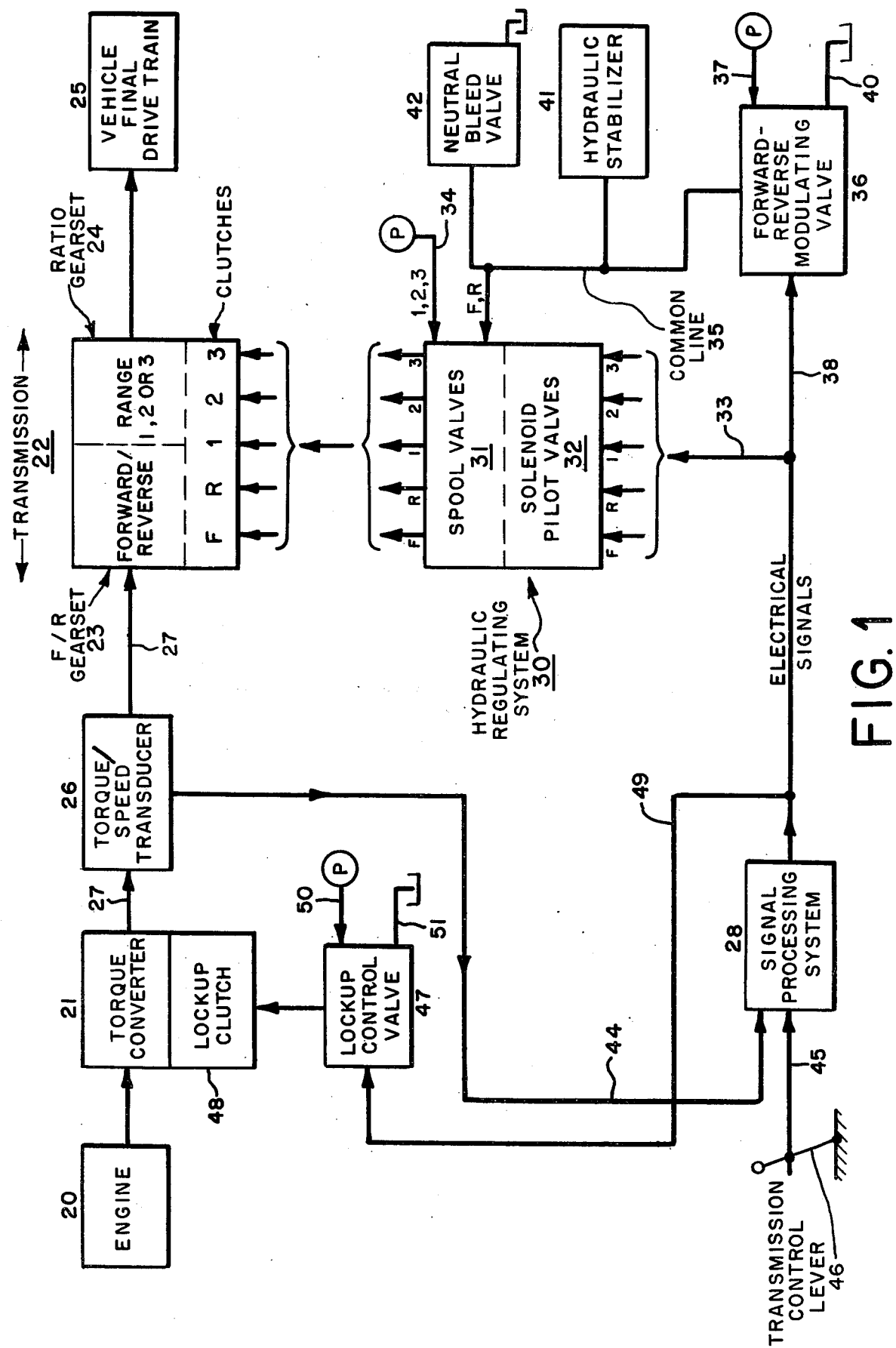
FIG. 1 is a block diagram of a vehicle power train, together with the control system of this invention.

FIG. 1 illustrates the general power flow in a vehicle, from an engine 20 through a torque converter 21, a transmission 22 including a forward/reverse gearset 23 and a ratio-changing gearset 24, and a final drive train 25, which may include components such as a differential gearset (not shown) for transferring power to the vehicle wheels. In general, the described components are conventional, being well-known and understood in the power-shifted transmission art.

A component not generally found in the vehicle driveline is a torque/speed transducer 26, shown coupled between the output side of torque converter 21 and the input side of transmission 22. As a practical matter the transducer can be coupled at any point between the engine and the final drive train of the vehicle and provide usable data. However, in a preferred embodiment the transducer was positioned as shown, to derive an indication of the output torque from the torque converter as well as the speed of shaft 27, and provide this signal to a signal processing system 28. Preferably transducer 26 is noncontacting, and for this reason the same shaft transfers torque from converter 21 to the input side of transmission 22. An effective torque/speed transducer for use in such an arrangement is described and claimed in U.S. Pat. No. 4,100,794, which issued July 18, 1978, entitled "System for Measuring Torque and Speed of Rotating Shaft", and assigned to the assignee of this application.

A hydraulic regulating system 30 is provided, and is shown providing output signals to the respective clutches in transmission 22. That is, the various spool valves 31 (to be described in connection with FIG. 2) provide selective signals to the forward/reverse clutch, designated F and R in the drawing, and to the respective range clutches, where the first, second and third ranges are indicated by the corresponding numerals. In the preferred embodiment a plurality of solenoid pilot valves 32 were provided to regulate operation of the associated spool valves, when each pilot valve received an actuating electrical signal over the branch conductor designated 33. Those skilled in the art will understand that each line or conductor, such as 33, actually represents two or more electrical conductors (or a single electrical conductor and some ground reference conductor) for transferring electrical signals. Source pressure for the spool valves is received over line 34, and a different line 35, designated the common line, provides a source of pressure for the forward and reverse clutches. A forward/reverse modulating valve 36 receives input pressure from a supply line 37 and, in accordance with the electrical signal received over its input line 38, controls the pressure supply from its output connection to common line 35. A portion of the fluid supplied to valve 36, and not required in line 35, is returned over line 40 to sump.

In accordance with an important aspect of the invention, a hydraulic stabilizer or accumulator 41 is coupled to the common line 35 as shown, to affect the flow between forward/reverse modulating valve 36 and hydraulic regulating system 30. In earlier systems, such as that taught in U.S. Pat. No. 4,259,882, a considerable amount of fluid was required to be passed from the modulating valve through the common line to the hydraulic regulating system. In that earlier patent the modulating valve was referenced 54, the common line 78, and the hydraulic regulating system can be represented by valve 56. It is desirable to enhance the rapid filling of the directional clutch, denoted 12 in that earlier patent, when it is stroked from end to end, that is, throughout its entire range of movement. By adding accumulator 41 as shown in FIG. 1 of this application, the hydraulic stabilizer or accumulator is fully charged at the completion of such a shift, as full line pressure is applied over common line 35. At the time of the next forward/reverse shift, this pressure is connected to the oncoming clutch (forward or reverse), and the full charge of the hydraulic stabilizer is rapidly dumped into the oncoming clutch, nearly filling the clutch. A small additional amount of fluid is added by the modulating valve 36 to complete the filling process. By providing the stored "shot" of fluid from the stabilizer, the modulating valve 36 can be sized to provide much higher system stability and a higher gain in the system. Further, the use of the stabilizer avoids excessive pressure drops in the long hydraulic line which is generally needed to fill the oncoming clutch. The stabilizer functions as a low frequency, lag-lead compensator to avoid the instability which might otherwise result from the enhanced system gain.

In accordance with another important aspect of the invention, a neutral bleed valve 42 is provided and coupled to the same common line 35 as is the hydraulic stabilizer 41. With the system in the neutral position, valve 42 operates to reduce the pressure in common line 35 substantially, by approximately one-half. This reduces the amount of fluid in hydraulic stabilizer 41 by a corresponding amount. This allows for more effective pressurization of the oncoming clutch, because the forward/reverse clutch is in a middle or balanced position in neutral, and need only be stroked half the distance it is displaced in a full end to end operation. Thus a very rapid and precise operation of the forward/reverse clutch is achieved from the neutral position, without overfilling the clutch and losing modulation capabilities. A more complete description of the neutral bleed valve and its operation will be set out in connection with FIG. 2.

As shown in FIG. 1, signal process system 28 receives a torque/speed information signal over line 44 from transducer 26, and also receives direction and range information over line 45 from transmission control lever 46. The signal processing system then provides a plurality of output electrical signals over lines 33, 38 and 49. The signal on line 38 regulates forward/reverse modulating valve 36, and the signals on line 33 regulate operation of the pilot valves. The signal on line 49 governs application and release of a lockup control valve 47, which in turn determines the operation of a lockup clutch 48 in the torque converter assembly. Valve 47 is supplied with the main line pressure over line 50, and returns fluid to sump over line 51.

Figure 2:
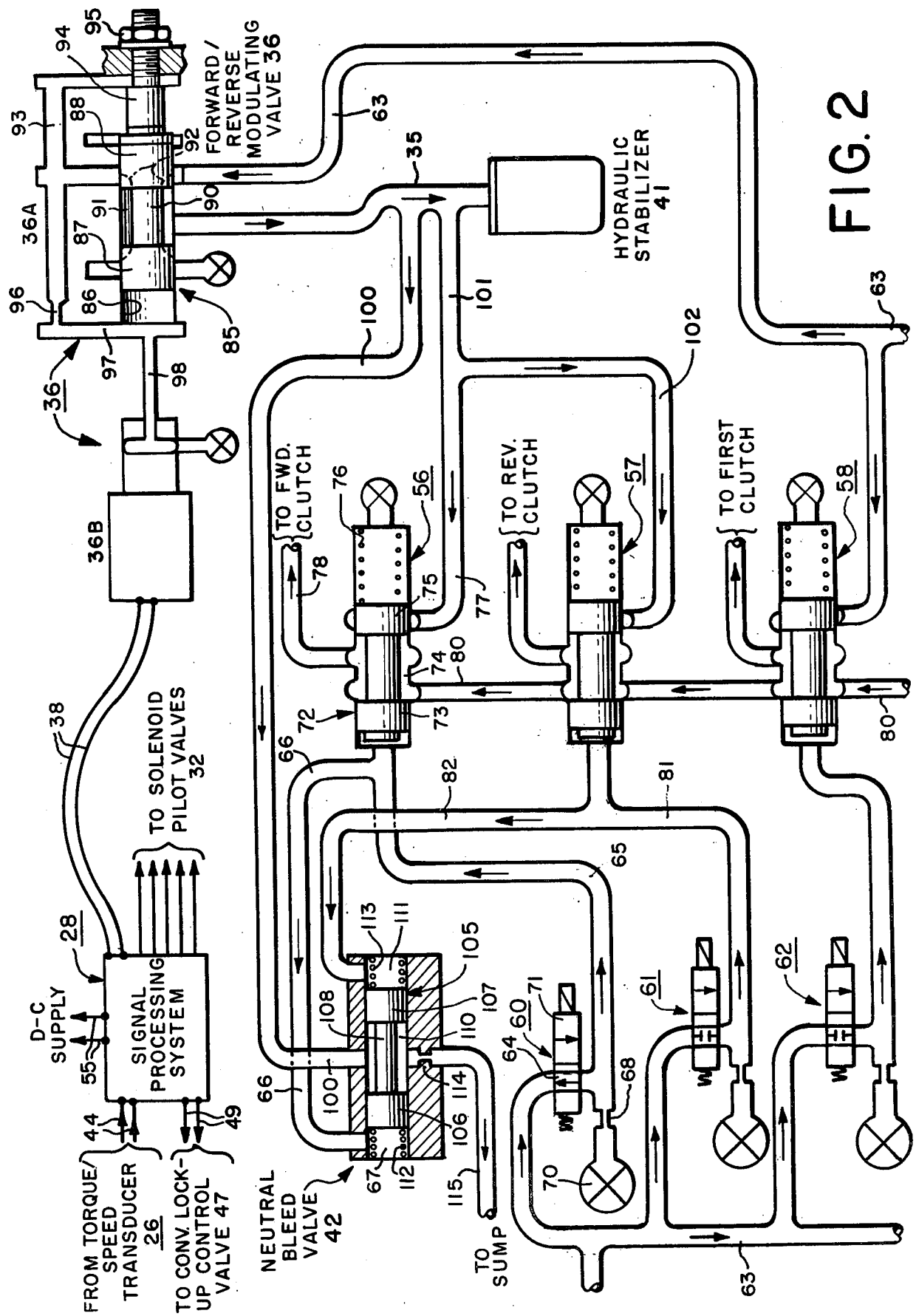
FIG. 2 is a partial schematic diagram, depicting certain details of the hydraulic regulating system in the control system.

FIG. 2 depicts certain portions of the hydraulic regulating system 30 shown in FIG. 1, in addition to forward/reverse modulating valve 36, hydraulic stabilizer 41, and neutral bleed valve 42. In addition, signal processing system 28 is shown as a block, receiving an energizing supply voltage over input conductors 55, and the signal from torque/speed transducer 26 over lines 44. Signal processing system 28 provides the various output signals already explained in connection with FIG. 1, and these signals will be explained more completely in connection with FIG. 3.

Of the hydraulic regulating system 30, three spool valves 56, 57 and 58 are illustrated in FIG. 2. These valves direct the fluid under pressure to the forward clutch, the reverse clutch, and to the first range clutch, respectively. The second and third range clutch spool valves are not illustrated, as they are exactly the same as the illustrated valves. In addition, three of the solenoid pilot valves 32 are depicted, and designated 60, 61 and 62. These valves are selectively energized from the signal processing system to actuate the spool valves 56, 57 and 58, respectively. A supply line 63 provides fluid under pressure to each of the solenoid pilot valves as shown. Valve 60, by way of example, includes a normally closed section 64 which in the position illustrated blocks communication with the channel 65, which channel communicates with the left end of forward clutch spool valve 56 and, through channel 66, with chamber 67 in the left end of neutral bleed valve 42. Below pilot valve 60 an orifice 68 communicates between line 65 and a sump connection 70. When the pilot valve is energized, it is displaced to the left and positions the open-flow section 71 between supply line 63 and channel 65, allowing fluid under pressure to pass through line 65 to the left end of spool valve 56. This valve has a spool 72, which includes a first land 73, an intermediate channel 74 and another land 75. A spring 76 is provided between land 75 and the right end of the bore to urge spool 72 to the left, normally blocking channel 77 from communicating with output channel 78 as shown. The other line 80 shown communicating with channel 74 is a low pressure line providing lubrication fluid only, and does not affect the control operation of each spool valve. Hence, when fluid under pressure is supplied by pilot valve 60 through line 65 to the left end of land 73, spool 72 is displaced to the right and channel 74 provides communication between lines 77 and 78, to apply the forward clutch. The other solenoid valves and spool valves have similar structures and function. There are operating differences from the manner in which solenoid pilot valves 60, 61 are intercoupled not only with their respective spool valves, but also valve 61 applies fluid under pressure through line 81 not only to the left end of reverse clutch spool valve 57, but also through line 82 to the right end of neutral bleed valve 42. The other pilot valves each apply pressure only to its associated spool valve, as shown with pilot valve 62 and first clutch spool valve 58.

As shown in the right portion of FIG. 2, fluid under pressure is applied through the same line 63 which supplies the pilot valves to the supply port of each of the range clutch spool valves, of which only valve 58 is shown. In addition, this fluid under pressure is supplied to the supply port of the modulating portion 36A of the forward/reverse modulating valve 36. This valve also includes a solenoid valve portion 36B, regulated over line 38 by a signal from signal processing system 28. In general, the solenoid valve 36B is functionally similar to valve 64 in FIG. 1 of U.S. Pat. No. 4,259,882, and valve 54 in that patent is analogous to modulating valve 36 of this application. A detailed explanation of a suitable modulating valve assembly is described in the above-identified U.S. Pat. No. 4,116,321. In the embodiment shown in FIG. 2 of this application, the solenoid valve portion 36B is a valve commercially available from the Nuclear Valve Division of the assignee, and the modulating portion 36A is a valve commercially available from the Rockford Division of assignee. Each of the solenoid pilot valves is a commercial unit of Waterman Hydraulics, Part No. 702357-OL. The spool valves are commercially available from the Rockford Division of assignee, as is the neutral bleed valve 42. Hydraulic stabilizer 41 is a unit purchased from Hydrodyne, designated R2.5-30-30, modified with A-321117-X1 and A-321118-X1 springs. The part numbers for the springs are numbers employed by the Rockford Division of Borg-Warner Corporation. In the preferred embodiment and for the particular system, the hydraulic stabilizer had a capacity of 9.3 cubic inches. Those skilled in the art will appreciate that this stabilizer can be utilized to accommodate different sizes, and equivalent valve structures can similarly be substituted for those designated above. The specific identifications have only been set out to enable those skilled in the art to practice the invention with a minimum of experimentation.

As shown, the modulating portion of valve 36 includes a spool 85 inserted in a bore 86. Spool 85 includes first and second land portions 87 and 88, connected by a reduced-diameter portion 90 which defines a channel 91 between the spool and the bore. Land 88 is slotted as shown at 92, to define an orifice between supply line 63 and common line or output line 35 when the valve spool is in the position shown. Supply line 63, when spool 85 is in the position shown, communicates with line 93 which applies pressure to the right side of a plug 94, positioned in a reduced bore as shown. An adjustable stop nut 95 regulates the maximum movement of plug 94. Line 93 also communicates through an orifice 96 with a supply channel 97, which is coupled both to bore 86 and, through line 98, to the solenoid or regulating portion of the modulating valve. Spool 85 is in the position shown when the system is in neutral, so that some fluid from supply line 63 is metered through orifice 92 and channel 91 to common line 35. The spool can be moved from this position by action of solenoid valve portion 36B, exhausting fluid through line 98 to the sump and developing a pressure drop across orifice 96. This lower pressure at the left end of spool 85 effects movement of the spool to the left, effectively blocking supply line 63 and shutting off flow to common line 35.

Hydraulic stabilizer 41 is connected as shown to common line 35. Thus, fluid in this line, passed from valve 36, is supplied (1) to the hydraulic stabilizer; (2) through line 100 to the center channel of neutral bleed valve 42; (3) through lines 101 and 77 to the input or supply connection of forward clutch spool valve 56; and (4) through lines 101, 102 to the input or supply port of reverse clutch spool valve 57.

Neutral bleed valve 42 comprises a central spool 105, which includes first and second lands 106, 107 connected by a reduced-diameter portion 108 to define a channel 110 between the lands. The bore of the valve defines a chamber 67 at its left end, and another chamber 111 at its right end. A spring 112 is positioned in chamber 67, and a spring 113 is positioned in chamber 111. An important feature of valve 42 is an orifice 114, provided as shown between channel 110 in the valve and discharge line 115, which completes a path to sump or a low pressure lubrication line.

When the system is in the neutral position, neither the forward nor the reverse clutch is applied, and thus there is no fluid pressure in line 66 or in line 82, connected respectively to chambers 67 and 111 at the left and right sides of neutral bleed valve 42. Thus the valve is in the position shown, with a straight-through path completed from central line 100 through channel 110, orifice 114, and line 115 to sump. However, the first part of this communication is from line 63, through the effective orifice provided by the channel 92 cut in land 88 of forward/reverse modulating valve 36, through channel 91 of this valve, line 35, and line 100 to central channel 110 of valve 42, and then over the just-described orifice 114 to sump. This places effective orifice 92 in valve 36 in series with orifice 114 in valve 42, and these orifices are sized equally. This means in the neutral position of the system and of bleed valve 42, the supply pressure in line 63 is dropped to approximately half the suppy pressure in common line 35, coupled to hydraulic stabilizer 41. With half the pressure, stabilizer 41 is filled to only half its capacity in the neutral position of the system. However, this volume is completely adequate to stroke the forward/reverse clutch, sometimes termed the master clutch, from the neutral to either the full forward or the full reverse position. This is important because the proper amount of oil effects rapid and positive application of the clutch without any overfilling, and thus avoids the possible loss of modulation capability. When the system is in the forward position, the pressure in line 65 passed to the left end of forward clutch spool valve 56 is also passed through line 66 to chamber 67, and driving spool 105 of the neutral bleed valve to the right, so that land 106 interrupts the communication between lines 100 and 115. In the reverse position of the system, the fluid under pressure in line 81 supplied to reverse clutch spool valve 57 is also passed through line 82 to chamber 111, displacing spool 105 to the left so that land 107 interrupts communication between lines 100 and 115. Thus while a significant improvement in the basic system of the earlier patent is achieved with hydraulic stabilizer 41, there is a further substantial advance with the addition of neutral bleed valve 42 and its cooperation with forward/reverse modulating valve 36.

The system as thus far described provides very substantial improvements in the operation of the transmission, particularly in the control of the forward/reverse clutch. However, there are still range shifts, that is, in addition to being in either forward or reverse, the transmission must be controlled through the first, second and third ratios. After the improvements already described were implemented in a prototype system, the shifting through the ranges was noticably harsh and dissipated substantial power. In the driveline, as seen in FIG. 1, it is apparent that some energy can be dissipated in torque converter 21 and in the forward/reverse gearset 23 by reason of the control arrangement just described. However, the clutches for the range shifting gears are not usually sized to dissipate much energy during the shift. The ratio shifts are difficult in large vehicles of the order of 100,000 lbs., which frequently must work on hilly, muddy terrain. The total time allowed for a shift is frequently 3/10 second, and this is a difficult problem which does not admit of an easy solution.

In accordance with an important aspect of this invention, the signal processing system 28 was implemented to effect smooth, rapid range shifts by partially slipping the forward or reverse clutch then engaged during each ratio change. While this improvement was accomplished with the digital processor, those skilled in the art will readily appreciate that analog control systems such as that described in the earlier patent can also be utilized.

Figures 3, 4:
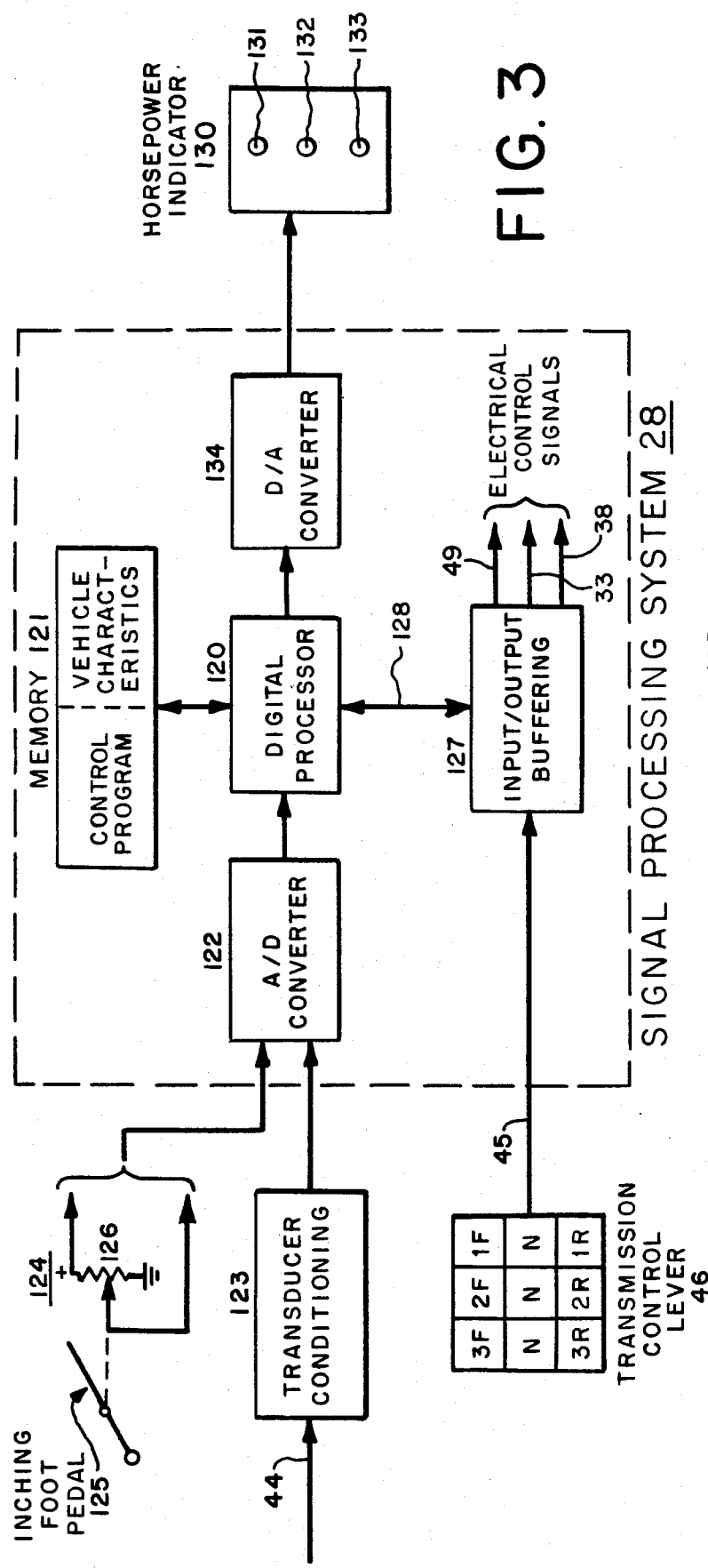
FIG. 3 is a block diagram of major components in the signal processing system of the control system.
FIG. 4 is a graphical illustration useful in understanding a part of the signal processing system.
Figure 5:
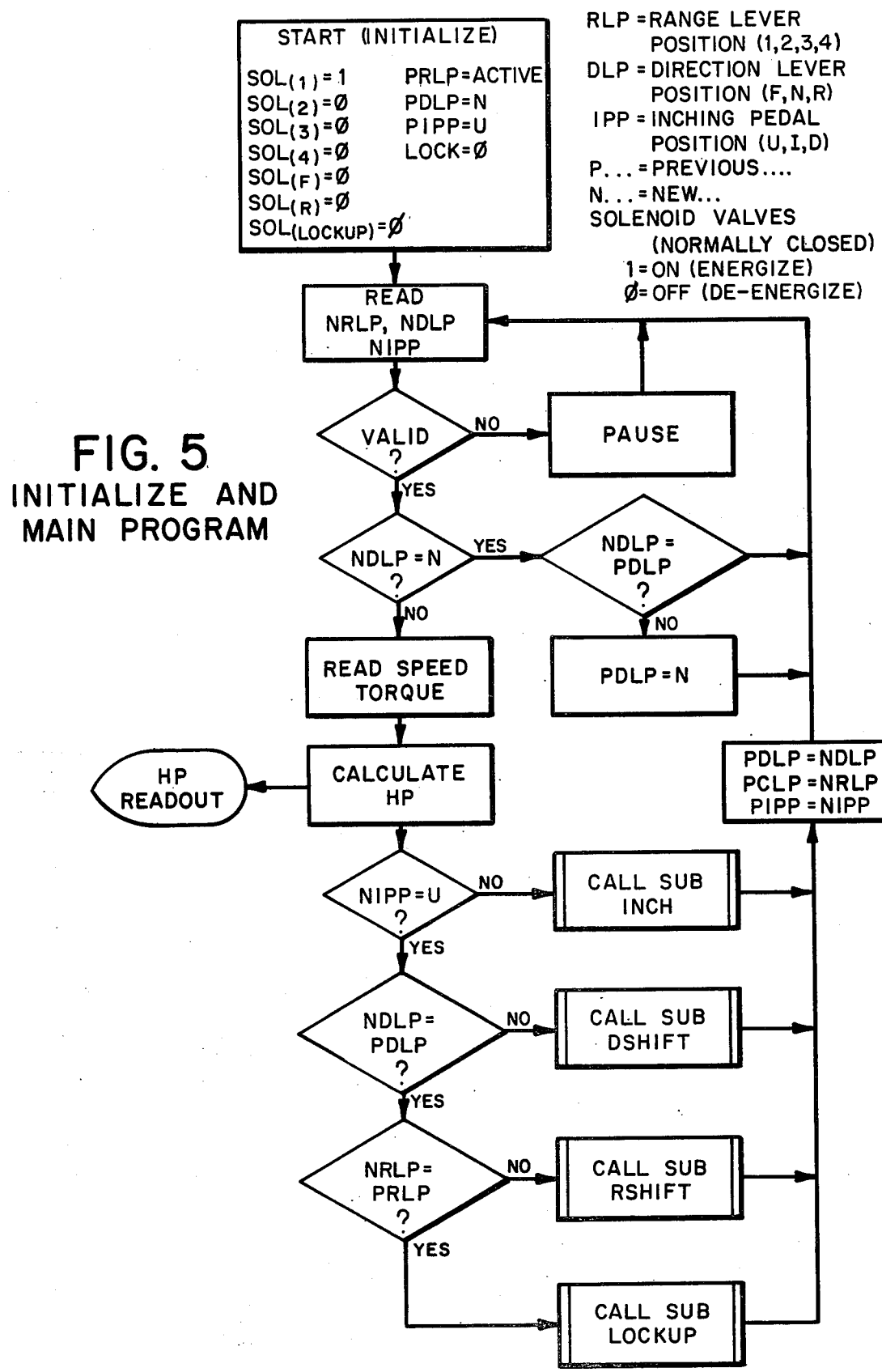
FIGS. 5–10B are a series of flow charts useful in understanding operation of the control system of this invention.

As shown in FIG. 3, the signal processing system 28 includes a digital processor 120, which in a preferred embodiment was a Motorola Type 6800 device. Associated with the processor is a memory 121, in which the various vehicle characteristics such as weight, shift points at various speeds and torque conditions, and other characteristics are stored. In addition, the control program for the processor is stored in the memory. The digital processor receives input information from an A/D converter 122, which in turn receives input information from a transducer conditioning circuit 123 coupled over line 44 to transducer 26. The A/D converter also receives input information from an inching control circuit 124, which includes a foot pedal 125 connected to operate the movable contact of a potentiometer 126 to provide an analog electrical signal related to the foot pedal position. This is used by the driver only in the inching mode as will be described later. Another input to system 28 is from transmission control lever 46 over line 45 to input/output buffering stage 127. The lever 46 is actually a matrix type selector with the pattern as shown, so that the signal on line 45 indicates both the direction and the range in which lever 46 is presently positioned. In addition, a direction change cannot be made without displacing lever 46 through the neutral position. Basically the signal on line 45 denotes whether the lever 46 is in neutral, one of the three forward ratios, or one of the three reverse ratios. This information after passage through input/output buffering stage 127 is passed over line 128 to digital processor 120, which then has all the input information necessary for the controlled slipping of the range clutches in accordance with the routines as will be described. The resultant control signals developed by processor 120 are passed over line 128 to buffering stage 127, and over the appropriate ones of the conductors 49, 33 and 38 to the various portions of the system as already described in connection with FIGS. 1 and 2.

A useful and important feature of the invention is a horsepower indicator 130, which comprises a plurality of indicator lamps 131, 132 and 133. Information for indicator 130 is produced in digital processor 120, and passed over a D/A converter 134 to the horsepower indicator. In the preferred embodiment the three lamps, 131, 132 and 133 were made different colors, amber, green and blue. The indicator was positioned in a convenient place adjacent the operator's control panel on the vehicle. The digital processor simply calculates the horsepower from the speed and torque signals developed by transducer 26. The lamps are selectively illuminated in accordance with operating conditions in the three different shaded areas of the speed versus horsepower curve depicted in FIG. 4. The peak area of the curve 135 corresponds to the green lamp illumination of the indicator. This is the area of maximum productivity for a unit such as a dozer. However, if the vehicle encounters too large a load with its blade, the vehicle speed drops and the horsepower drops, and the system is operating in the region 136. Under these conditions the amber light is illuminated to warn the operator that the vehicle is much under the desired efficiency condition. In a similar manner if the load is too light, the vehicle speed increases and the horsepower drops, denoting operation in region 137, and the blue lamp is illuminated. By simply watching the three lamps the dozer operator can regulate the blade depth, thus changing the load to keep the green lamp illuminated and thereby operate the vehicle at peak efficiency.

To assist those skilled in the art to practice the invention with a minimum of experimentation, FIGS. 5-10B set out flow charts for the various routines and subroutines utilized with the digital processor to prove the operation of the invention. The first flow chart FIG. 5 indicates the start up sequence for the vehicle and the processor. The legends are defined in the upper right-hand corner of FIG. 5, and programmers and technicians will readily follow the looping and the sequencing for the various operations. The references to a fourth solenoid valve in the program shows that the flow chart and program were developed so that a four-speed transmission could be controlled. Hence the extra position is indicated for the range lever position, and the direction lever position is one of three, forward, neutral or reverse (F, N or R). Of course, both these "lever positions" are actually derived from a single unit, transmission control lever 46, as previously explained. The operator has three separate options with the inching pedal position, either up (U, completely off the pedal), intermediate (I, pedal partially depressed), or down (D), with the pedal floored. The various legends in the start-up routine to develop initial conditions and values in the control system are evident from the flow chart.

Figure 6:
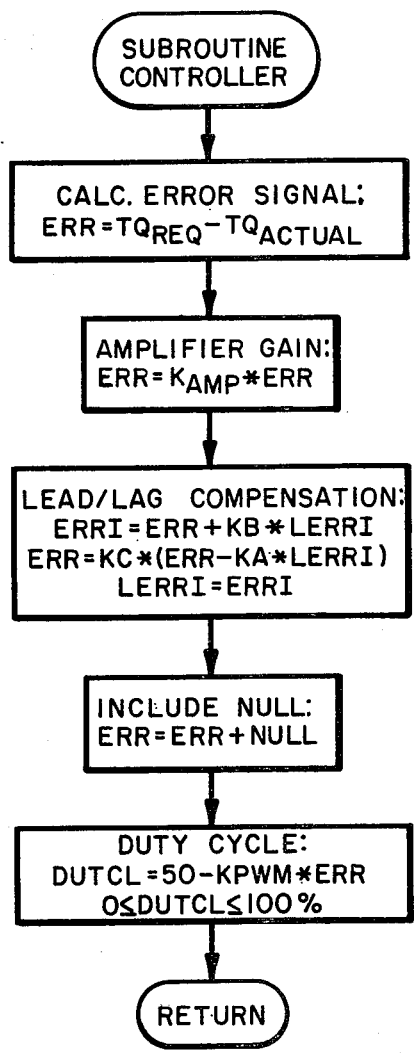

The subroutine for the controller, digital processor 120, is shown in FIG. 6. The symbol ERRI denotes the "error input", and the symbol "L" in front of this symbol indicates the last error input. A "K" always denotes a constant used to compensate a part of the system or represent vehicle characteristics. The symbol "*" is used to signify a multiplication function.

Figure 7A:
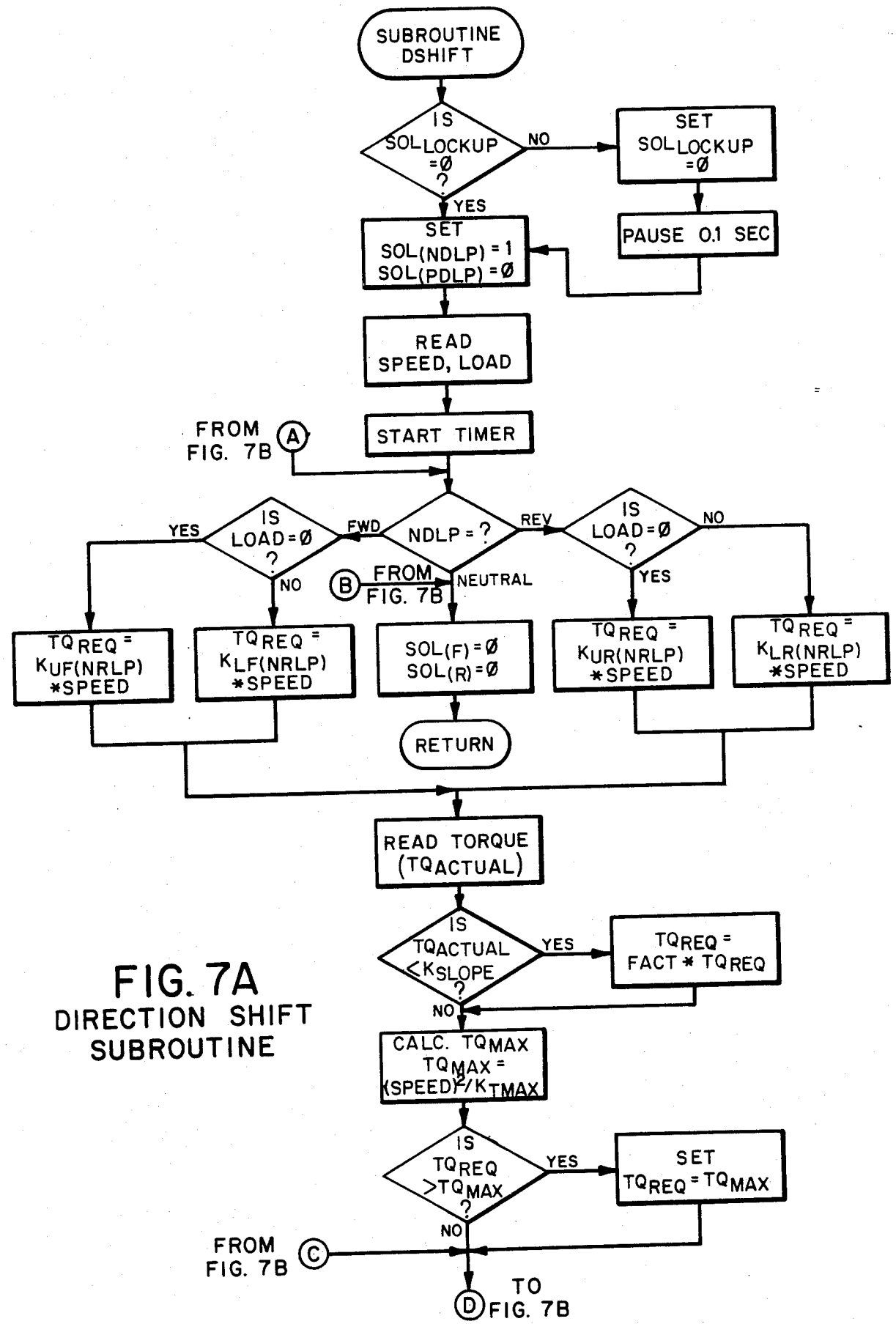

The subroutine for the direction shift (DSHIFT) is set out in FIGS. 7A and 7B. The digital processor or controller computes the torque level based on present conditions of transmission input speed, transmission range setting, and direction setting. The torque set level for the processing is modified if (1) the vehicle is loaded sufficiently to significantly affect vehicle weight, (2) the actual torque signal indicates the vehicle is operating on a downhill slope, or (3) the computed torque level exceeds that which would drive the torque converter speed in a negative direction. Such a schedule of torque levels can be based upon a prescribed acceleration rate, or predetermined time period, specified to reverse direction of the vehicle.

Figure 8A:
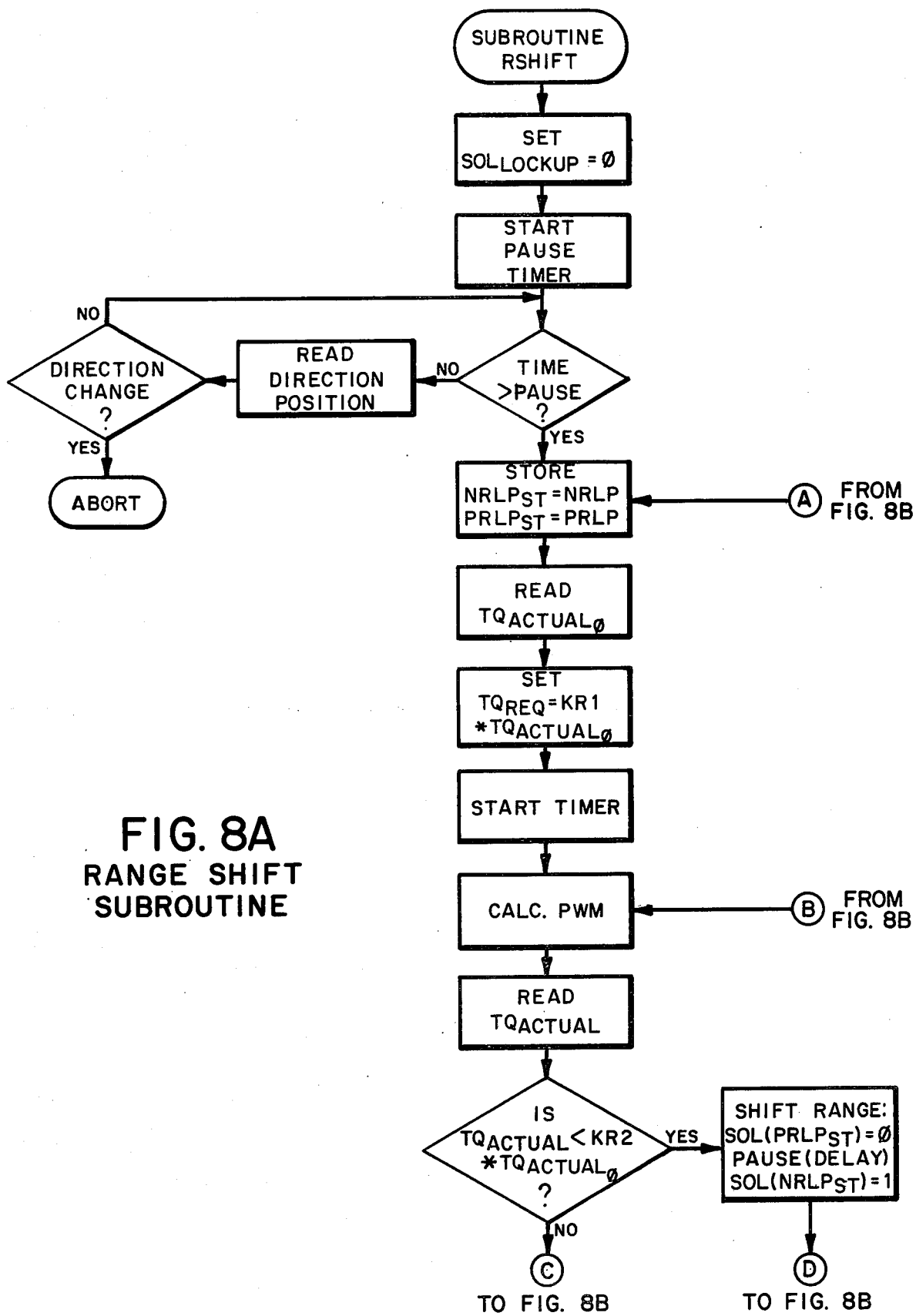
Figure 8B:
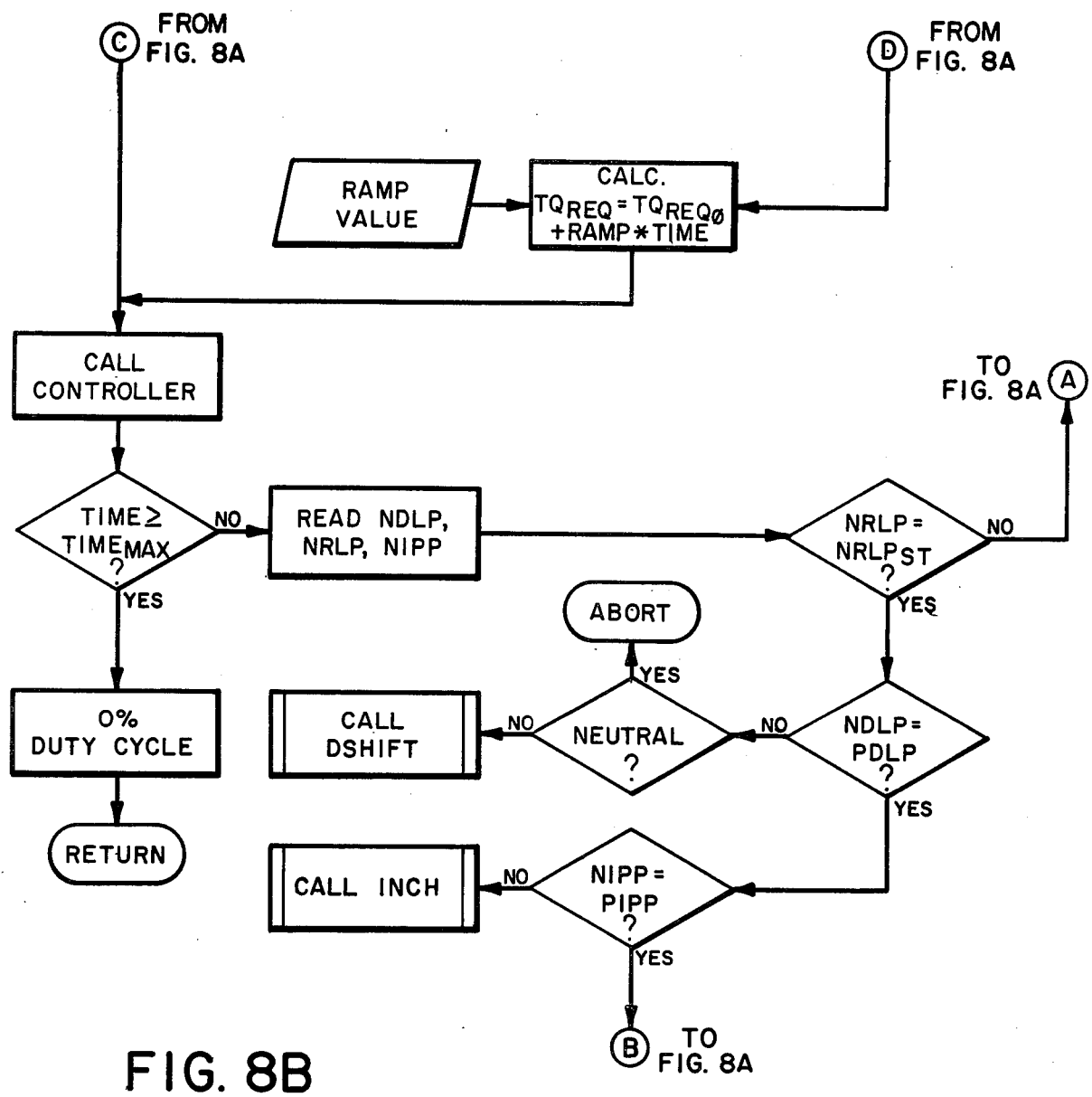

The subroutine for the range shift (RSHIFT) is shown in FIGS. 8A and 8B. Briefly the controller stores the present value of the input torque at the beginning of the range shift. A low percentage of this stored torque value is called for in the control system, causing the hydraulic regulating system to reduce the pressure in the directional (or forward/reverse) clutch, allowing the directional clutch to slip. The program assumes that when the actual torque level has dropped to approximately 50% of the stored value, the clutch is indeed released and the range clutches are then applied and released in an unloaded condition. After the oncoming range clutch is applied, the digital processor commands the system to increase the torque rapidly in the directional clutch, thus absorbing the range shift inertia change in the high capacity directional clutch. If the shift is not completed at a preset time (TIME MAX), the controller "knows" the shift should be over and completes the restoration of the directional clutch torque. This is an important and economically significant improvement achieved with the present invention.

Figure 9B:
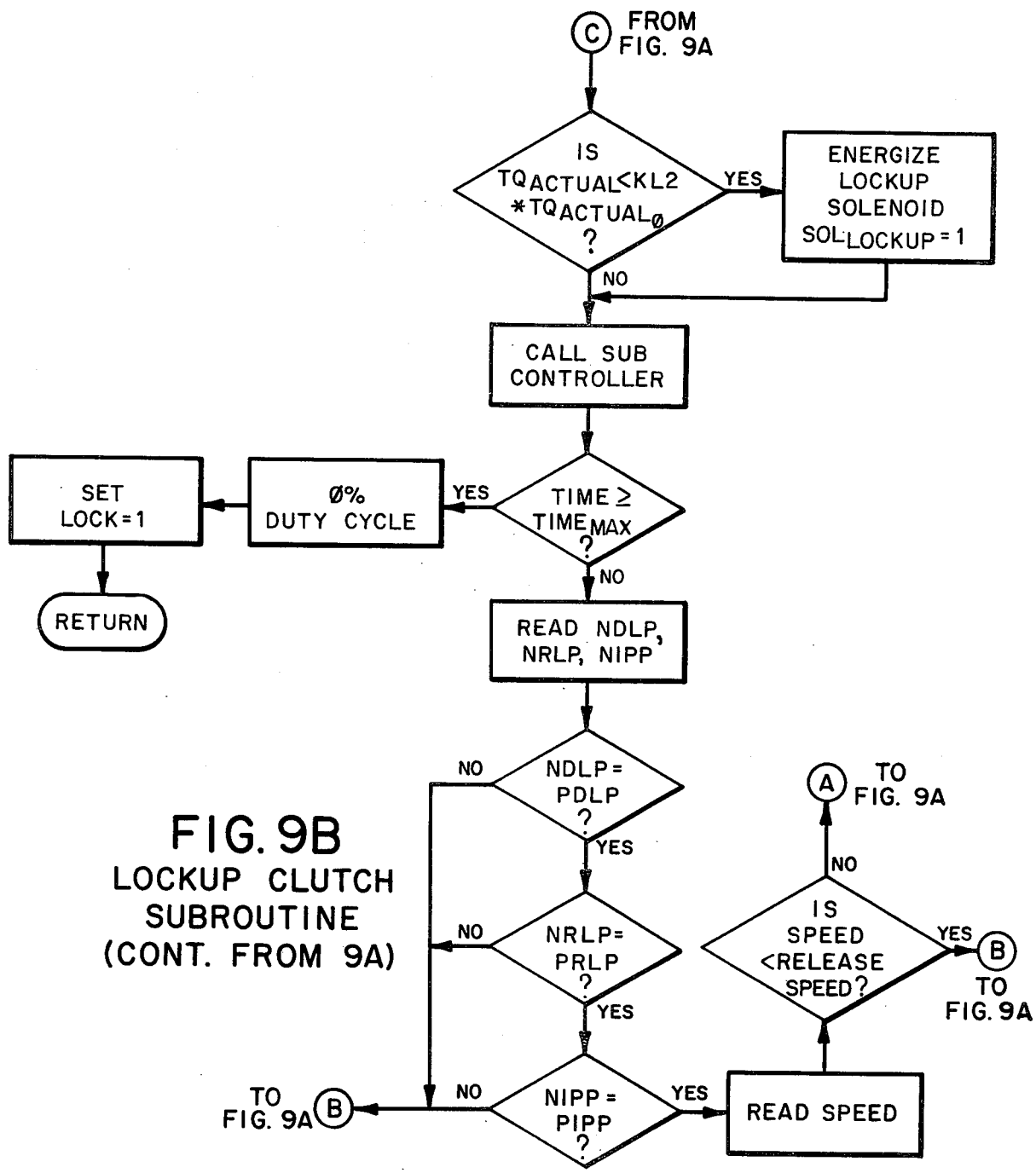

The subroutine for the lockup clutch 48 is shown in FIGS. 9A and 9B. This clutch is applied to lock up the torque converter when operating conditions indicate a sustained speed of the torque converter output shaft. Each time a command is given for a direction change or a range shift, the lockup clutch is released and unlocks the torque converter.

Figure 10A:
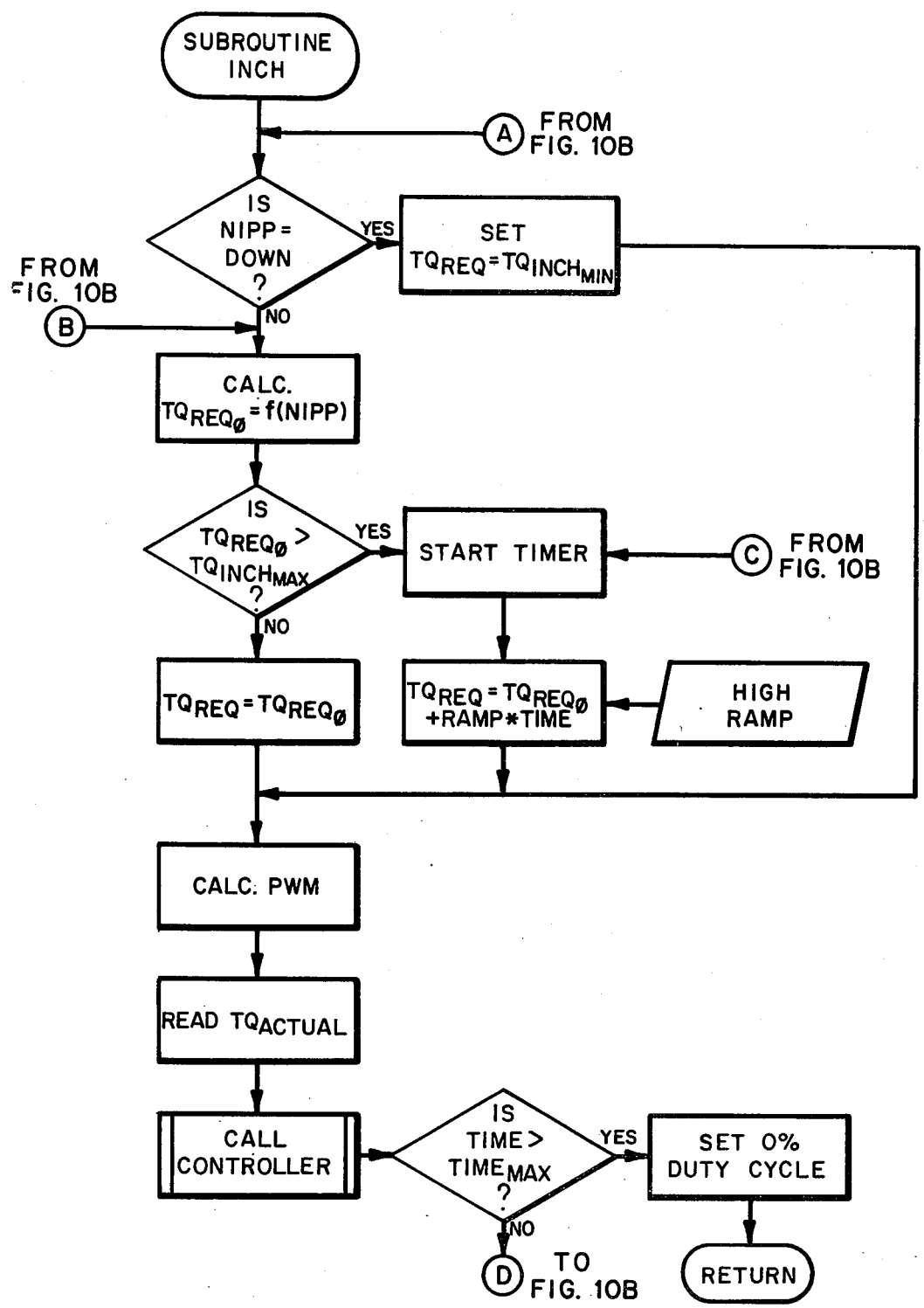
Figure 10B:
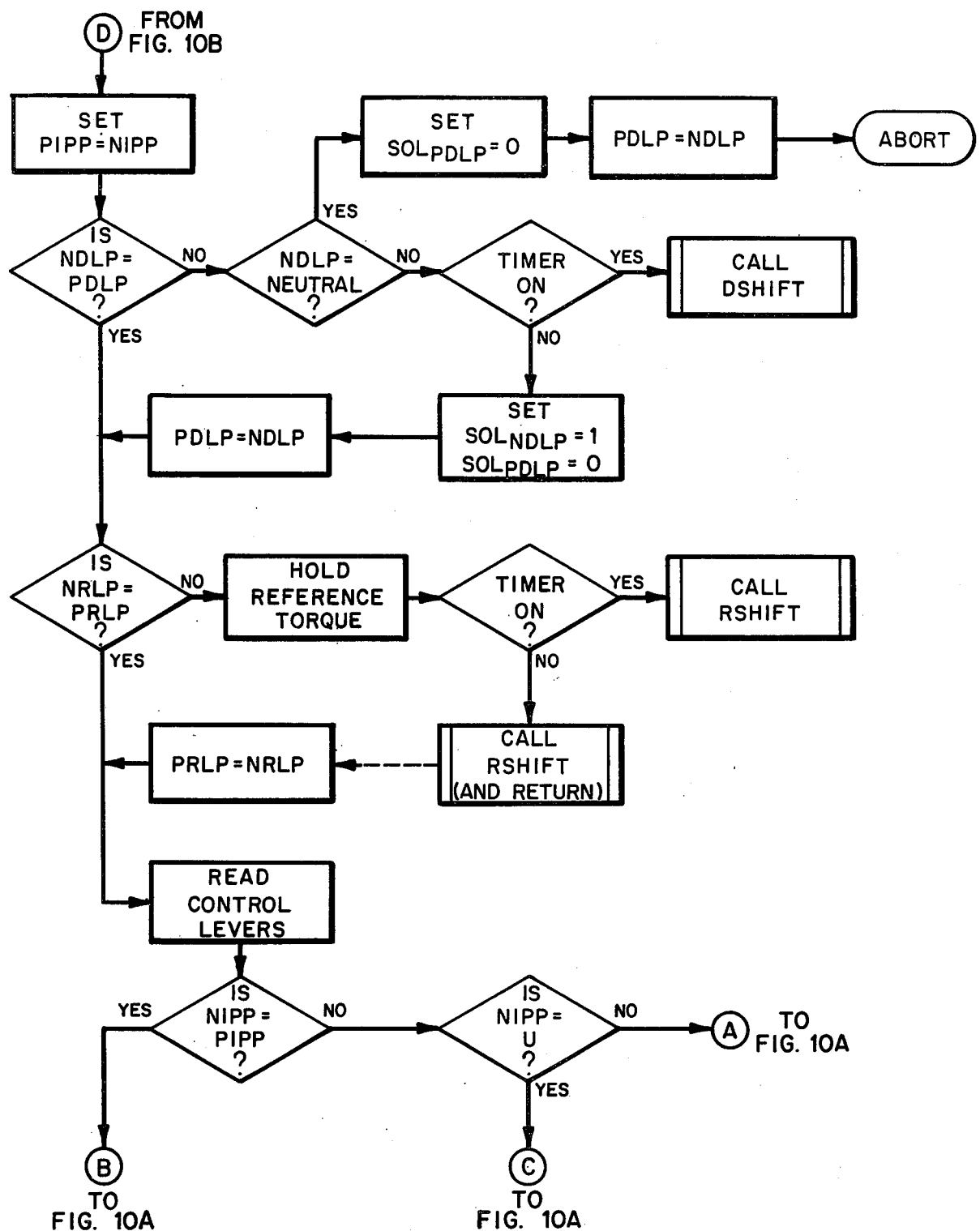

The subroutine for the inching mode is shown in FIGS. 10A and 10B. This subroutine is not basic to the inventive system, but is useful to provide a slow vehicle speed at a time of high engine speed. Because continuous slipping of the directional clutch is necessary, torque limits must be maintained in order to operate within the energy capacity of the forward/reverse clutch. Thus a floor pedal 125 has been provided as the vehicle operator's input to the digital processor in the inching mode. The pedal position is proportional to the clutch torque required for a desired vehicle speed. As this pedal is depressed, the resultant electrical signal provided to the processor defines a set point in the torque control system. A fully depressed pedal (position D) corresponds to the minimum amount of torque sufficient to keep the forward/reverse clutch filled, and provide mechanical application of the brakes. As the pedal is gradually released, the torque set point is correspondingly increased with time, bringing the clutch pressure up until the main clutch locks.

While only a particular arrangement of the invention has been described and illustrated, those skilled in the art will readily appreciate that various modifications and alterations may be made therein. It is therefore the intention in the appended claims to cover all such modifications and alterations as may fall within the true spirit and scope of the invention.

What is claimed is:

1. A control system for regulating the torque transferred from an engine through a vehicle transmission including a plurality of clutches selectively actuable to control the amount and direction of torque transferred, which control system has a neutral position and comprises a hydraulic regulating system connected to control application and release of the clutches, a forward-reverse modulating valve coupled over a common line to the hydraulic regulating system to control fluid flow to the modulating valve, a signal processing system connected to control signals to the hydraulic regulating system and to the forward-reverse modulating valve as a function of the torque level in the vehicle drive train, and a hydraulic stabilizer, coupled to the common line between the forward-reverse modulating valve and the hydraulic regulating system, for storing a volume of fluid, at the completion of each directional shift, sufficient to stroke the oncoming one of said clutches which determines the direction of the torque transfer, thus enhancing system operation by improving the flow to the clutches and also enhancing system gain without imposing a substantial pressure drop or instability on the system.

2. A control system for regulating the torque transferred from an engine through a vehicle transmission including a plurality of clutches selectively actuable to control the amount and direction of torque transferred, which control system has a neutral position and comprises a hydraulic regulating system connected to control application and release of the clutches, a forward-reverse modulating valve coupled over a common line to the hydraulic regulating system to control fluid flow to the modulating valve, a signal processing system connected to control signals to the hydraulic regulating system and to the forward-reverse modulating valve as a function of the torque level in the vehicle drive train, and a hydraulic stabilizer, coupled to the common line between the forward-reverse modulating valve and the hydraulic regulating system, for enhancing system operation by improving the flow to the clutches and also enhancing system gain without imposing a substantial pressure drop or instability on the system, in which the forward-reverse modulating valve includes means defining an effective orifice when the modulating valve is in its neutral position, and a neutral bleed valve, coupled to the common line and having an orifice therein, which neutral bleed valve in its neutral position is effective to pass fluid from the common line through its orifice and to a sump, so that the effective orifice in the modulating valve is coupled in series with the orifice in the neutral bleed valve, reducing the pressure and thus the flow at the hydraulic stabilizer when the system is in its neutral position, providing an effective charge in the stabilizer which is less than the stabilizer capacity but sufficient to apply the oncoming clutch in the next directional shift.

3. A control system as claimed in claim 2, in which said clutches include a forward/reverse directional clutch to control torque direction and a plurality of range clutches to control torque multiplication in the drive train, means for signalling the desired direction and multiplication of the torque in the drive train, and means, including the signal processing system, for slipping the directional clutch each time the range clutches are applied and released to change the level of torque multiplication.

4. A control system as claimed in claim 3, including a horsepower indicator coupled to the signal processing system, which indicator has means visible to the vehicle operator for signalling when the vehicle is operating in the most efficient manner.

5. A control system as claimed in claim 3, in which the signal processing system includes a digital processor and a memory coupled to the processor, which memory stores both a control program for the processor and data representing vehicle characteristics.

6. A control system as claimed in claim 5, and a transducer connected to provide a signal varying as a function of the torque passed from the engine to the transmission, in which the initial torque value at the beginning of a range shift is stored in the memory, the directional clutch is slipped to a value substantially below the stored initial torque value, the range shift is accomplished, and the directional clutch is re-applied.

7. A control system as claimed in claim 6, in which the directional clutch is always re-applied at the expiration of a preset time interval, to prevent undue wear of the directional clutch.

8. A control system as claimed in claim 5, and further comprising control means for the operator to effect inching operation, that is, travel of the vehicle at a very low speed while the engine is operating at a high speed.

9. A control system for regulating the amount and direction of torque transferred from an engine through a transmission to a vehicle final drive train, in which the transmission includes a neutral position, a forward-reverse directional clutch and a plurality of range clutches selectively actuable to control the direction and amount of torque transferred, which control system comprises:
   a hydraulic regulating system, including an input connection for receiving fluid under pressure and a plurality of output connections coupled to said clutches, and having a plurality of valves for directing the fluid under pressure through said output connections to the appropriate ones of said clutches;
   a forward-reverse modulating valve, having its output coupled over a common line to the input connection of the hydraulic regulating system, which modulating valve has an input connection for receiving fluid under pressure and an output connection for returning fluid to a sump;
   a signal processing system, having a plurality of output connections for passing control signals to the valves of the hydraulic regulating system and to the forward-reverse modulating valve;
   a transducer, coupled to the signal processing system, connected to supply an input signal to the signal processing system as a function of the torque at a point between the engine and the final drive train of the vehicle; and
   a hydraulic stabilizer, coupled to the common line between the forward-reverse modulating valve and the hydraulic regulating system, for providing an effective charge in the stabilizer which is less than the stabilizer capacity but still adequate to stroke the forward-reverse directional clutch, thus enhancing system operation by improving the flow to the clutches and enhancing system gain without imposing a substantial pressure drop or instability on the system.

10. A control system for regulating the amount and direction of torque transferred from an engine through a transmission to a vehicle final drive train, in which the transmission includes a neutral position, a forward-reverse directional clutch and a plurality of range clutches selectively actuable to control the direction and amount of torque transferred, which control system comprises:
   a hydraulic regulating system, including an input connection for receiving fluid under pressure and a plurality of output connections coupled to said clutches, and having a plurality of valves for directing the fluid under pressure through said output connections to the appropriate ones of said clutches;
   a forward-reverse modulating valve, having its output coupled over a common line to the input connection of the hydraulic regulating system, which modulating valve has an input connection for receiving fluid under pressure and an output connection for returning fluid to a sump;
   a signal processing system, having a plurality of output connections for passing control signals to the valves of the hydraulic regulating system and to the forward-reverse modulating valve;
   a transducer coupled to the signal processing system, connected to supply an input signal to the signal processing system as a function of the torque at a point between the engine and the final drive train of the vehicle; and
   a hydraulic stabilizer, coupled to the common line between the forward-reverse modulating valve and the hydraulic regulating system, in which the forward-reverse modulating valve includes a spool having a land slotted to define an effective orifice when the modulating valve is in its neutral position, and a neutral bleed valve, coupled to the common line and having an orifice therein, which neutral bleed valve in its neutral position is effective to pass fluid from the common line through its orifice and to a sump, so that the effective orifice in the modulating valve is coupled in series with the orifice in the neutral bleed valve, reducing the pressure and thus the flow at the hydraulic stabilizer when the system is in its neutral position, providing an effective charge in the stabilizer which is less than the stabilizer capacity by an amount related to the ratio between the size of the effective orifice in the modulating valve and the size of the orifice in the neutral bleed valve.

11. A control system as claimed in claim 10, in which said orifice sizes are substantially equal, reducing the pressure in the common line and thus the flow to the hydraulic stabilizer by substantially 50% when the system is in the neutral position.

12. A control system as claimed in claim 10, in which the range clutches control torque multiplication in the drive train, a transmission control lever for signalling the desired direction and multiplication of the torque in the drive train, and means, including the signal processing system, for slipping and then re-applying the directional clutch each time the range clutches are applied and released to change the level of torque multiplication.

13. A control system as claimed in claim 12, including a horsepower indicator coupled to the signal processing system, which indicator has a plurality of lamps visible to the vehicle operator for signalling the efficiency of vehicle operation.

14. A control system as claimed in claim 12, in which the signal processing system includes a digital processor, and a memory coupled to the processor, which memory stores both a control program for the digital processor and data representing vehicle characteristics and desired shift points.

15. A control system as claimed in claim 14, and a torque/speed transducer connected to provide a signal varying as a function of the torque passed from the engine to the transmission, in which the initial value at the beginning of a range shift is stored in the memory, the directional clutch is slipped to a value approximately 50% of the stored initial torque value, the range shift is accomplished by application and release of the appropriate range clutches, and the directional clutch is then re-applied.

16. A control system as claimed in claim 15, in which the directional clutch is always re-applied at the expiration of a preset time interval, to prevent undue wear of the directional clutch.

17. A control system as claimed in claim 14, further comprising a pedal for the operator to produce a signal for the control of operation in the inching mode, that is, travel of the vehicle at a very low speed while the engine is operating at a high speed.

18. A control system as claimed in claim 15, in which a torque converter is coupled between the engine and the final drive train, the transducer is positioned to provide torque and speed data at the output side of the converter, and a lockup clutch is coupled to the converter and controlled by the signal processor system, to apply the lockup clutch and lock up the torque converter when its output speed is substantially constant, and to release the lockup clutch whenever a range shift is called for.

* * * * *